C. K. WILCOX.
Vehicle-Wheel Hub.

No. 8,868. Reissued Aug. 26, 1879.

*Witnesses:*
Donn P. Twitchell
W. A. Geyer

*Inventor:*
C. K. Wilcox
By Dodgerson
Attys

N. PETERS, PHOTO-LITHOGRAPHER, WASHINGTON, D. C.

UNITED STATES PATENT OFFICE.

CHARLES K. WILCOX, OF DAYTON, OHIO.

IMPROVEMENT IN VEHICLE-WHEEL HUBS.

Specification forming part of Letters Patent No. 199,244, dated January 15, 1878; Reissue No. 8,868, dated August 26, 1879; application filed July 17, 1879.

*To all whom it may concern:*

Be it known that I, CHARLES K. WILCOX, of Dayton, in the county of Montgomery and State of Ohio, have invented certain new and useful Improvements in Vehicle-Wheel Hubs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to a wooden hub having its waist or middle portion compressed and solidified and provided with surrounding bands of metal; and the invention consists in constructing the hub, in the first instance, with finished ends, an enlarged belt or zone at the middle, and annular grooves adjacent to said belt, and subsequently compressing said belt to its finished size, and at the same time compressing into the grooves metal bands, which engage over and hold the ends of the compressed belt, as hereinafter described.

The invention also further consists in combining, with a grooved wooden hub, a metal strengthening-band seated in the groove, and provided with a continuous side lip or flange, arranged to engage over the outside surface of the hub and prevent the ends of the fiber from rising or working loose adjacent to the band, the peculiarity of my invention in this regard consisting in the fact that the wood is not scarfed down or cut away adjacent to the groove to receive the lip, but, on the contrary, is left intact, and the lip passed over and forced down into the outer surface, so that the ends of the fiber adjoining the groove are confined and held firmly within or beneath the lip.

The invention also further consists in a peculiar form of the metal band.

Figure 1:
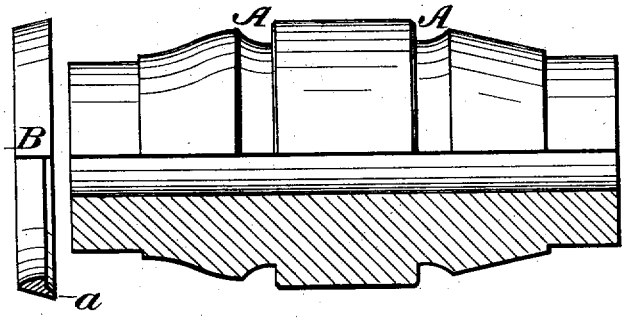
Figure 2:
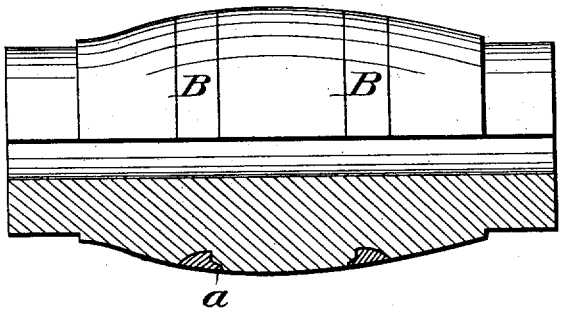

Figure 1 is a view, half in section and half in elevation, illustrating the hub as constructed in the first instance, previous to the compression and the application of the bands. Fig. 2 is a similar view, showing the finished hub.

As shown in Fig. 1, the hub is first made with its ends finished complete in the usual form, and with an enlarged belt around the middle, and also with two circumferential grooves, A, around the ends contiguous to the enlarged belt.

After constructing the hub as above, I provide two bands, B, of wrought-iron or other malleable metal, such as shown detached in Fig. 1. The bands are made of a sectional form, corresponding to that of the grooves A, and are each provided on the inner side with an overhanging lip, *a*, adapted to fit upon and encircle the enlarged belt of wood on the hub, and with an internal vertical shoulder or face at the inner edge of the overhanging lip.

After placing the bands upon the ends of the hub, with their lips engaging over the ends of the enlarged belt, I then force the hub and bands into a tapering die of such size and form that it compresses the wooden belt and the bands, and reduces them to a diameter corresponding with the ends of the hub, thereby giving the hub the finished appearance represented in Fig. 2, and seating the bands in the grooves, with their lips seated over and into the ends of the compressed central belt in such manner as to prevent it from expanding and confine the ends of all the fibers.

In this way I produce cheaply, and with a comparatively small expenditure of power, a hub which has the portion in which the spokes bear solidified and condensed to a great degree of hardness, and this, too, without the employment of the heavy machinery or heavy bands which would be required in case the entire body of the hub were to be condensed.

I am aware that it is old to strengthen wooden hubs by means of metallic bands compressed into grooves therein and otherwise applied thereto.

I am also aware that a machine has been hitherto patented for compressing and banding various wooden bodies enumerated in said patent.

I am also aware that it has been proposed to compress metallic bands upon wooden hubs, and at the same time compress the wood more or less adjacent to the band.

I am also aware that bands have been heretofore made with thin edges and a central thickened portion of rounding form and seated by compression into a groove of like form, the lip being seated in the groove on an inclined or chamfered surface, instead of overhanging the groove and engaging upon the exterior surface of the hub, as in my case.

Having thus described my invention, what I claim is—

1. A wooden hub having the wood left in its natural condition at its ends, and having at the middle a highly-condensed zone or belt provided with metal confining-bands, substantially as described.

2. The herein-described method of constructing a wooden hub, consisting in first constructing the hub with finished ends and an enlarged central belt, and then applying metal bands to the ends of said belt, and subsequently reducing the belts and the bands by compression to a size corresponding with the previously-finished ends.

3. A metal hub-band having the overhanging lip at its inner side and the internal vertical, or substantially vertical, shoulder at the inside of said lip, substantially as shown and described, the lip being adapted to confine the spoke-receiving portion of the hub, and the shoulder to abut squarely against the grain of said portion to prevent its displacement.

4. The method of preparing banded wooden hubs, consisting in grooving the hub and applying thereto a band having a body adapted to fill the groove, and a side lip adapted and arranged to extend beyond the groove and engage over the outside surface of the hub, and finally seating said band down firmly within the groove, with its lip overhanging and covering the ends of the fiber adjacent thereto.

5. A grooved wooden hub, in combination with a seamless metallic band having a body seated in the groove, and a side lip seated over and upon the outside surface of the hub adjacent to the groove, said surface being left uncut or without scarfing to receive said lip, so that the lip may cover the ends of all the surface fibers.

6. The grooved wooden hub, in combination with the continuous metallic band having its body seated in the groove, and the side lip seated flush within the hub, over the outside of the surface adjacent to the groove, and confining beneath it the ends of the outermost fiber, as described and shown.

CHARLES K. WILCOX.

Witnesses:
P. T. DODGE,
WILLIAM W. DODGE.